(12) United States Patent
Hawryluck et al.

(10) Patent No.: US 7,936,999 B1
(45) Date of Patent: May 3, 2011

(54) AUTOMATIC GAIN CONTROL IN A COHERENT OPTICAL RECEIVER (75) Inventors: Mark Hawryluck, Kanata (CA); Kim B. Roberts, Nepean (CA); Kuang Tsan Wu, Kanata (CA)

(73) Assignee: Ciena Corporation, Linthicum, MD (US)

( * ) Notice: Subject to any disclaimer, the term of this patent is extended or adjusted under 35 U.S.C. 154(b) by 709 days.

(21) Appl. No.: 11/533,438

(22) Filed: Sep. 20, 2006

Related U.S. Application Data (60) Provisional application No. 60/728,751, filed on Oct. 21, 2005.

(51) Int. Cl.
H04B 10/148 (2006.01)

(52) U.S. Cl. ........ 398/206; 398/152; 398/202; 398/205; 398/208; 398/209

(58) Field of Classification Search ............... 398/25–29, 398/33, 202–207, 152, 208, 209
See application file for complete search history.

(56) References Cited

U.S. PATENT DOCUMENTS

| | | | |
|---|---|---|---|
| 4,506,388 A | 3/1985 | Monerie et al. | |
| 4,720,827 A | 1/1988 | Kanaji | |
| 4,723,316 A | 2/1988 | Glance | |
| 4,965,858 A | 10/1990 | Naito et al. | |
| 5,457,563 A | 10/1995 | Van Deventer | |
| 5,473,463 A | 12/1995 | van Deventer | |
| 5,995,512 A | 11/1999 | Pogue et al. | |
| 6,266,172 B1 * | 7/2001 | Zirngibl | 398/25 |
| 6,341,021 B1 * | 1/2002 | Wilner et al. | 398/79 |
| 6,473,222 B2 | 10/2002 | Hait et al. | |
| 6,584,145 B1 * | 6/2003 | Camagna et al. | 375/216 |
| 6,600,594 B1 * | 7/2003 | Ko et al. | 359/337 |
| 6,607,311 B1 | 8/2003 | Fishman et al. | |
| 6,782,211 B1 | 8/2004 | Core | |
| 7,035,548 B2 * | 4/2006 | Ooi et al. | 398/159 |
| 7,295,781 B1 * | 11/2007 | Eiselt et al. | 398/147 |
| 7,315,575 B2 * | 1/2008 | Sun et al. | 375/229 |
| 7,466,923 B1 * | 12/2008 | Eiselt et al. | 398/147 |
| 7,636,525 B1 * | 12/2009 | Bontu et al. | 398/208 |
| 2002/0003647 A1 * | 1/2002 | Tsuritani et al. | 359/173 |

(Continued)

FOREIGN PATENT DOCUMENTS

EP 1453239 A1 9/2004

(Continued)

OTHER PUBLICATIONS

Equalization. (1992). In Academic Press Dictionary of Science and Technology. Retrieved from http://www.credoreference.com/entry/apdst/equalization.*

(Continued)

Primary Examiner — Ken N Vanderpuye
Assistant Examiner — Tanya Ngo
(74) Attorney, Agent, or Firm — Kent Daniels; Blake, Cassels & Graydon LLP (57) ABSTRACT In a coherent optical receiver, a method of at least partially compensating Polarization Dependent Loss (PDL) of an optical signal received through an optical communications system. A respective multi-bit sample stream of each one of a pair of orthogonal received polarizations of the optical signal is tapped, and used to derive a respective metric value indicative of a quality of each multi-bit sample stream. A gain of an analog front end of the coherent optical receiver is adjusted based on the derived metric values.

24 Claims, 6 Drawing Sheets

U.S. PATENT DOCUMENTS

| | | | |
|---|---|---|---|
| 2002/0012152 A1* | 1/2002 | Agazzi et al. | 359/189 |
| 2002/0048062 A1* | 4/2002 | Sakamoto et al. | 359/124 |
| 2002/0054426 A1* | 5/2002 | Ishii | 359/337.1 |
| 2002/0186435 A1* | 12/2002 | Shpantzer et al. | 359/136 |
| 2003/0063285 A1* | 4/2003 | Pering et al. | 356/451 |
| 2003/0123884 A1 | 7/2003 | Willner et al. | |
| 2003/0175034 A1* | 9/2003 | Noe | 398/152 |
| 2003/0177156 A1* | 9/2003 | Van Der Valk et al. | 708/313 |
| 2003/0223760 A1* | 12/2003 | Takahara et al. | 398/147 |
| 2004/0004755 A1* | 1/2004 | Roberts et al. | 359/337 |
| 2004/0052524 A1* | 3/2004 | Arnold | 398/38 |
| 2004/0082300 A1* | 4/2004 | Scheck | 455/126 |
| 2004/0101240 A1* | 5/2004 | Viswanathan | 385/37 |
| 2004/0114939 A1* | 6/2004 | Taylor | 398/152 |
| 2004/0161243 A1* | 8/2004 | Ooi et al. | 398/152 |
| 2004/0213338 A1* | 10/2004 | Strawczynski et al. | 375/224 |
| 2005/0008070 A1* | 1/2005 | Wang et al. | 375/232 |
| 2005/0047453 A1* | 3/2005 | Futami et al. | 372/25 |
| 2005/0147415 A1* | 7/2005 | Fee et al. | 398/159 |
| 2005/0196176 A1* | 9/2005 | Sun et al. | 398/152 |
| 2008/0075472 A1* | 3/2008 | Liu et al. | 398/202 |

FOREIGN PATENT DOCUMENTS

| | | |
|---|---|---|
| GB | 2214381 A | 8/1989 |
| WO | WO 00/60776 A1 | 10/2000 |
| WO | WO 02/27994 A1 | 4/2002 |

OTHER PUBLICATIONS

Richard A. Linke, et al., "High-Capacity Coherent Lightwave Systems", Journal of Lightwave Technology, vol. 6, No. 11, Nov. 1988, pp. 1750-1769.

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeatered optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.

Y. Cai, et al., "On Performance of Coherent Phase-Shift-Keying Modulation in 40 Gb/s Long-Haul Optical Fiber Transmission Systems", OFC, Mar. 2006, pp. 1-3.

Matthias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Quadature Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler et al., "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbit/s QPSK Tansmission over 200-km Standard Single-Mode Fiber Using Homodyne Detection and Digital Signal Processing for Dispersion Compensation", OFC, Mar. 2006, pp. 1-3.

S. Calabro, et al., "An electrical polarization-state controller and demultiplexer for polarization multiplexed optical signals", ECOC-IOOC, Sep. 2003, pp. 1-2.

Reinhold Noe, "Phase Noise-Tolerant Synchronous QPSK/BPSK Baseband-Type Intradyne Receiver Concept With Feedforward Carrier Recovery", Journal of Lightwave Technology, vol. 23, No. 2, Feb. 2005, pp. 802-808.

Reinhold Noe, "PLL-Free Synchronous QPSK Polarization Multiplex/Diversity Receiver Concept With Digital I&Q Baseband Processing", IEEE Photonics Technology Letters, vol. 17, No. 4, Apr. 2005, pp. 887-889.

Ezra IP, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks, "Carrier and Bit Synchronization in Data Communication-A Tutorial Review", IEEE Transactions on Communications, vol. COM-28, No. 8, Aug. 1980, pp. 1107-1121.

M. Cavallari, et al., "Electronic Signal Processing for Differential Phase Modulation Formats", OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.

Yusuke Ota, et al., "High-Speed, Burst-Mode, Packet-Capable Optical Receiver and Instantaneous Clock Recovery for Optical Bus Opearation", Journal of Lightwave Technology, vol. 12, No. 2, Feb. 1994, pp. 325-331.

Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.

Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", CeLight Inc., OFC 2003, Mar. 24, 2003, pp. 1-14.

International Search Report for applicant's related International PCT Application PCT/CA2006/001458, Sep. 5, 2006.

International Search Report for applicant's related International PCT Application PCT/CA2006/001459, Sep. 5, 2006.

International Search Report for applicant's related International PCT Application PCT/CA2006/001460, Sep. 5, 2006.

\* cited by examiner

AUTOMATIC GAIN CONTROL IN A COHERENT OPTICAL RECEIVER

CROSS-REFERENCE TO RELATED APPLICATIONS

This application claims benefit under 35 U.S.C. 119(e) from U.S. Provisional Patent Application Ser. No. 60/728,751, entitled Automatic Gain Control, which was filed on Oct. 21, 2005.

TECHNICAL FIELD

The present invention relates to optical communications networks, and in particular to automatic gain control (AGC) in a coherent optical receiver.

BACKGROUND OF THE INVENTION

In the optical communications space, receivers based on coherent detection techniques have suffered disadvantages that have, to date, prevented successful deployment in "real-world" installed communications networks.

For example, coherent optical receivers tend to be highly sensitive to optical impairments of the received carrier signal. Optical signals received through conventional optical links are typically distorted by significant amounts of chromatic dispersion (CD) and polarization dependent impairments such as Polarization Mode Dispersion (PMD), polarization angle changes and polarization dependent loss (PDL). Chromatic dispersion (CD) on the order of 30,000 ps/nm, and polarization rotation transients at rates of $10^5$ Hz are commonly encountered.

Various methods and systems intended to address some of these limitations are known in the art. For example, a method of compensating polarization angle impairments are described in *PLL-Free Synchronous QPSK Polarization Multipex/Diversity Receiver Concept with Digital I&Q Baseband Processing*, R Noé, IEEE Photonics Technology Letters, Vol. 17, No. 4, April 2005. In the introduction of this same paper, Noé also alludes to the possibility of also compensating chromatic dispersion, but provides no further discussion as to how this might be done.

Applicant's co-pending U.S. patent application Ser. No. 09/975,985, entitled *Measurement Of Polarization Dependent Loss In An Optical Transmission System*; and Applicant's U.S. Pat. No. 6,760,149, entitled *Compensation Of Polarization Dependent Loss*, the content of which are hereby incorporated herein by reference, teach methods of measuring and compensating PDL in an optical communications system. The techniques described in these references are particularly suited to "real world" network installations, as opposed to laboratory simulations.

Known methods of compensating Polarization Dependent Loss (PDL) typically involve detecting the polarization state of the received optical signal, and then controlling one or more polarization rotators and/or variable optical attenuators (VOAs) to adjust the power level of each of the orthogonal polarizations. In laboratory systems, the polarization rotators and/or VOAs are often manually adjusted, which clearly does not provide a useful arrangement for real-world network installation. Automatic systems, for example as described in Applicant's U.S. Pat. No. 6,760,149, address this issue by implementing an adaptive control loop for driving the VOAs. However automated PDL compensation systems typically suffer a limitation in that the received optical signal must have certain known optical characteristics. At a minimum, the received optical signal must necessarily be a valid optical signal, rather than Amplified Spontaneous Emission (ASE) and thermal noise, for example. In many systems, it is also necessary that the received optical signal be composed of a pair of orthogonal polarizations.

However, in "real-world" network installations, neither of these criteria can be guaranteed. For example, following initial installation of an optical link, the only light in the optical fiber may be ASE and thermal noise. This state may persist for an extended period of time. Even in the absence of light in the fiber, there may be a significant DC offset or dark current in one or more parts of a receiver, which might capture an adaptive control loop. In other cases, optical signals that may be present at the input yet occupy optical frequencies significantly different to that of LO can add further noise and offset. For example such a signal may be centered at multiples of 50 GHz away from the nominal frequency of the LO. While the AC portion may be low-pass filtered out at the receiver input, the DC and noise portions can significantly affect the performance of an analog control loop.

Even when a valid signal is present in the link, the polarization impairments of the link may well be such that the transmitted polarizations are no-longer orthogonal when they reach the receiver. In addition, polarization rotation transients may well exceed the performance of a polarization rotator, thereby defeating any PDL compensation system that relies on a polarization rotator for part of its functionality. Polarization elements of the receiver that are nominally orthogonal or nominally equal will typically exhibit performance variations due to manufacturing, temperature, and aging effects.

Accordingly, cost-effective techniques for at least partially compensating effects of Polarization Dependent Loss (PDL) in a coherent optical receiver remain highly desirable.

SUMMARY OF THE INVENTION

An object of the present invention is to provide cost-effective techniques for at least partially compensating effects of Polarization Dependent Loss (PDL) in a coherent optical receiver.

Thus, an aspect of the present invention provides a method of at least partially compensating effects of Polarization Dependent Loss (PDL) of an optical signal received through an optical communications system. A respective multi-bit sample stream of each one of a pair of orthogonal received polarizations of the optical signal is tapped, and used to derive a respective metric value indicative of a quality of each multi-bit sample stream. A a power difference between each polarization is adjusted based on the derived metric values.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides techniques for at least partially compensating effects of Polarization Dependent Loss (PDL) in a coherent optical receiver of an optical communications network. Embodiments of the present invention are described below, by way of example only, with reference to FIGS. 1-3.

Figure 1:
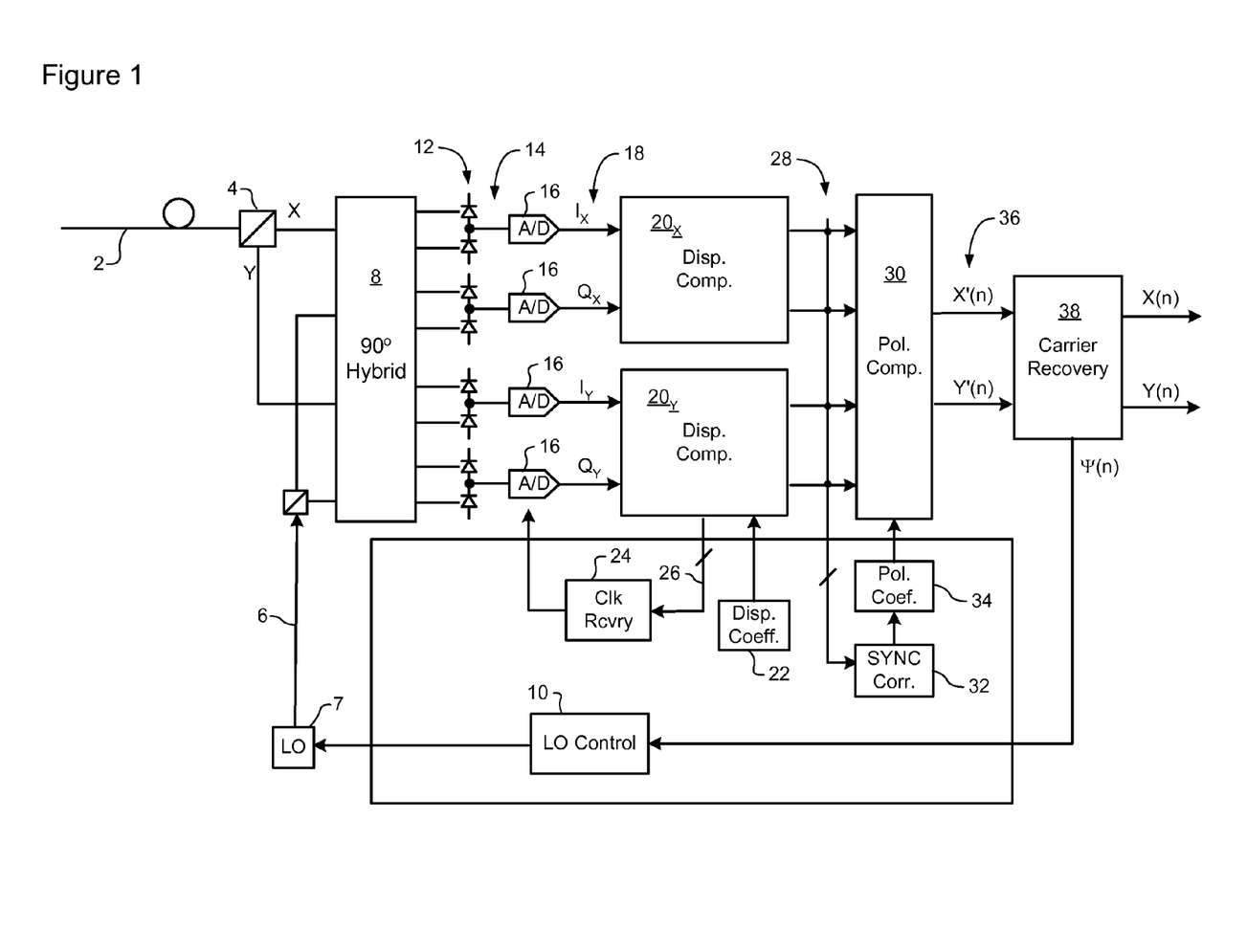
FIG. 1 is a block diagram schematically illustrating principal elements and operations of a coherent optical receiver in which methods in accordance with the present invention may be implemented.

FIG. 1 schematically illustrates a representative coherent optical receiver in which methods of the present invention may be implemented. In the coherent optical receiver of FIG. 1, an inbound optical signal is received through an optical link 2, split into orthogonal received polarizations by a Polarization Beam Splitter 4, and then mixed with a Local Oscillator (LO) signal 6 by a conventional 90° optical hybrid 8. It should be noted that the received polarizations appearing at the output of the beam Splitter 4 will not normally correspond with the transmittal polarizations of the optical signal. An LO controller 10 is provided to control the frequency of the LO 6 to minimize a frequency mismatch Δf between the LO 6 and the carrier of the inbound optical signal. The composite optical signals emerging from the optical hybrid 8 are supplied to respective photodetectors 12, which generate corresponding analog signals 14. The photodetector signals 14 are sampled by respective Analog-to-Digital (A/D) converters 16 to yield raw multi-bit digital sample streams 18 corresponding to In-phase (I) and Quadrature (Q) components of each of the received polarizations. Although two photodetectors 12 are shown for each A/D 16 in FIG. 1, in some embodiments only one photodetector can be used for each A/D with satisfactory performance. Similarly, alternatives to the illustrated single-ended PIN photodiodes, such as, for example differential PIN diodes can be used. Known optical hybrids can have a number of outputs other than the four outputs shown in FIG. 1. Optical hybrids having six or eight outputs may be desirable in some cases.

As may be appreciated, the resolution of the A/D converters 16 is a balance between performance and cost. Increasing the resolution improves sampling accuracy, and thereby improves the extent to which signal distortions can be corrected by downstream dispersion and polarization compensators. However, this increased accuracy is obtained at a cost of increased complexity, silicon area and heat generation. It has been found that a resolution of n=5 or 6 bits provides satisfactory performance, at an acceptable cost. Preferably, the sample rate of the A/D converters 16 is selected to satisfy the Nyquist criterion for the highest anticipated symbol rate of the received optical signal. As will be appreciated, Nyquist sampling ensures that the raw sample streams 18 generated at the A/D converter output contains all of the information content of each photodetector signal 14, even if the sample timing (with reference to each received symbol) is ambiguous and/or unknown. From the A/D converter 16 block, the n-bit I and Q sample streams 18 of each received polarization are supplied to a respective Dispersion compensator 20, which operates on the sample stream(s) 18 to at least partially compensate chromatic dispersion of the received optical signal. As may be appreciated, a dispersion compensation block 20 can be linear or nonlinear, or some combination of both.

A dispersion training loop 22 for calculating the dispersion compensation coefficients (and thereby training the dispersion compensator 20) can be implemented using a variety of methods, such as those described in Applicant's co-pending U.S. patent application Ser. No. 11/423,822 filed Jun. 13, 2006.

A clock recovery block 24 may tap the dispersion compensators 20 to obtain an at least partially dispersion compensated sample stream 26, which is then used for recovering a clock signal, as described in Applicant's co-pending U.S. patent application Ser. Nos. 11/315,342 and 11/315,345, both of which were filed Dec. 23, 2005.

The dispersion-compensated sample streams 28 appearing at the output of the dispersion compensators 20 are then supplied to a polarization compensator 30 which operates to de-convolve the transmitted I and Q signal components of each transmitted polarization from the dispersion-compensated sample streams 28. Various methods may be used to implement the polarization compensator 30, such as, for example, a Finite Impulse Response (FIR) filter. A polarization training loop including a SYNC detector 32 and a coefficient calculator compute updated filter coefficients which are then downloaded to the polarization compensator 30 to track and compensate polarization impairments.

The distortion-compensated sample streams 36 appearing at the output of the polarization compensator 30 are then supplied to a carrier recovery block 38 for compensating residual frequency mismatch Δf between the LO and the carrier of the received optical signal, as well as symbol detection (for data recovery).

In general, the present invention provides a control loop for controlling gain of the analog front-end of the receiver, upstream of the A/D converters 16. This arrangement enables equalization of channel power between the received polarizations, thereby mitigating the direct effects of PDL. As may be seen in FIG. 2a, the control loop generally comprises a pair of voltage controlled Variable Optical Attenuators (VOAs) 40 for optically attenuating the received X and Y polarizations upstream of the optical hybrid 8; a block of Variable Gain Amplifiers (VGAs) 42 inserted in the analog signal path between the photodetectors 12 and the A/D converters 16, and a control unit 44 for controlling the VOAs and VGAs.

Figure 2A:
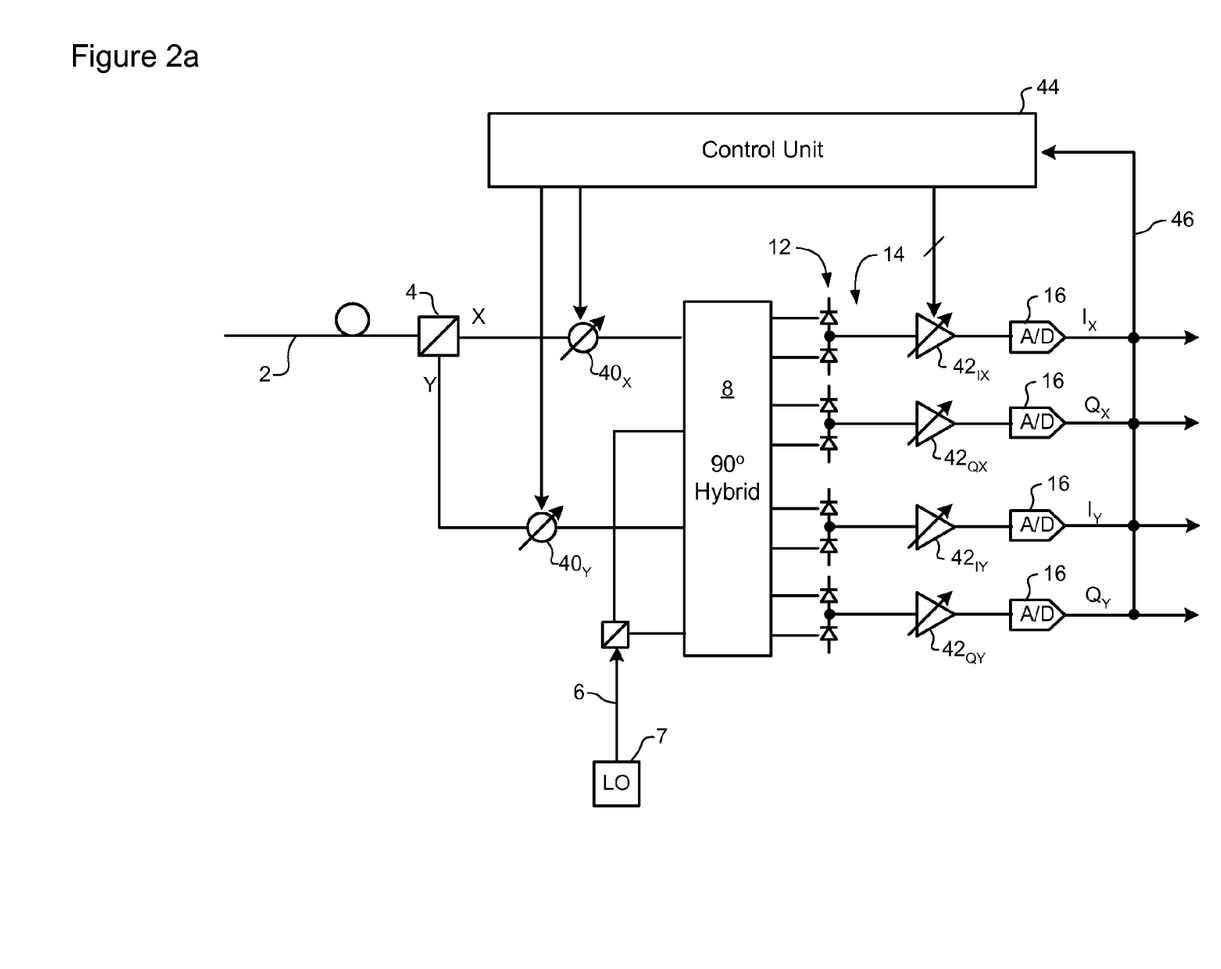
FIGS. 2a-2c are block diagrams schematically illustrating principal elements and operations of a control loop in accordance with representative embodiments of the present invention usable in the coherent optical receiver of FIG. 1.
Figure 2B:
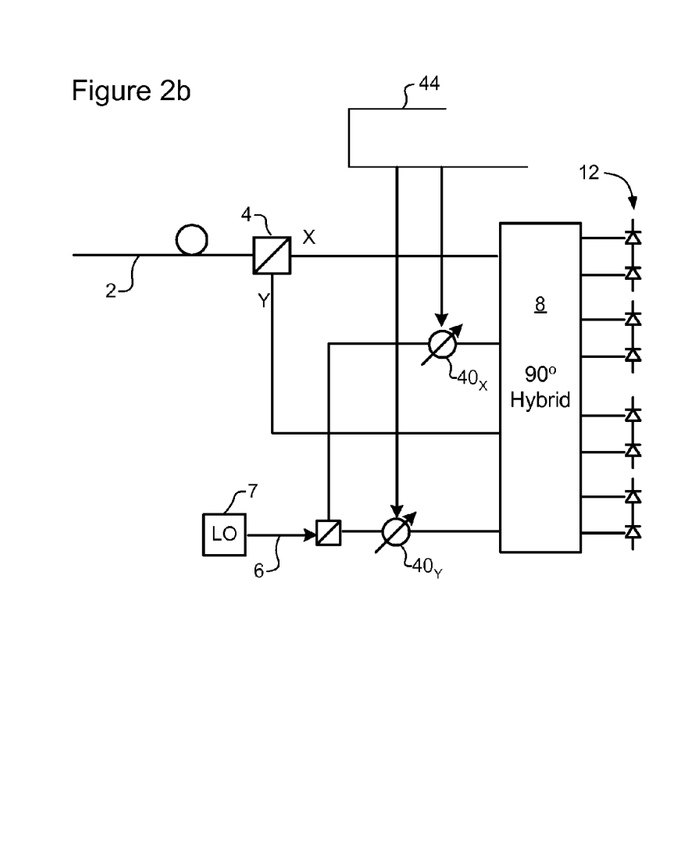
Figure 2C:
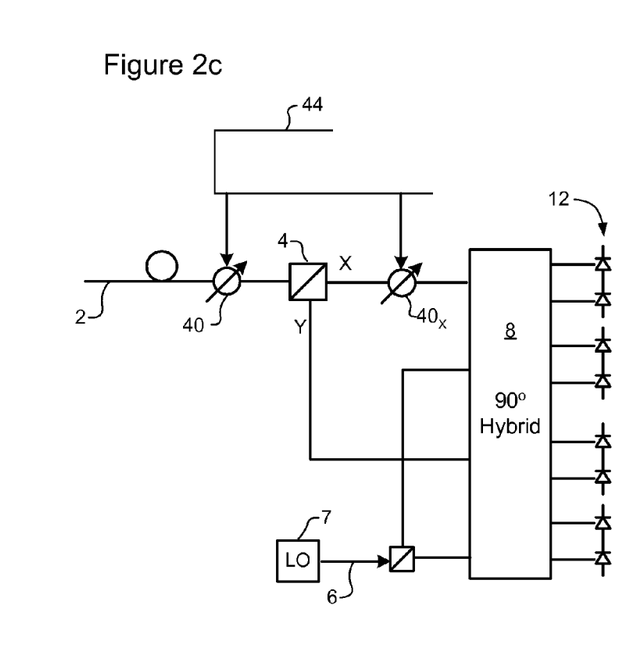

Any of a variety of voltage controlled VOAs known in the art may be used, and are readily available at moderate cost. In the illustrated embodiment, the VOAs are coupled in the path of each received polarization at the output of the beam Splitter 4. However, this is not essential. If desired, the VOAs 40 may be located to attenuate each polarization of the local oscillator (LO) signal 6, as shown in FIG. 2b. Alternative configurations may also be used. For example, one VOA can be connected in the propagation path of a respective polarization of the received optical signal and a second VOA to control the total input power of the received optical signal, as shown in FIG. 2c. A directly analogous embodiment would utilize one VOA connected in the propagation path of a respective polarization of the LO signal 6 and a second VOA to control the total LO signal power. All of these are configurations of two VOAs, which is an advantageous number.

In a further alternative embodiment, a VOA could be located in the propagation path of each composite signal at the output of the optical hybrid 8.

Those of ordinary skill in the art will appreciate that variations and/or combinations of the above arrangements can be realized utilizing more than two VOAs, if desired. Furthermore, it will be appreciated that the function of the VOAs may be implemented electronically using the VGAs, and in such cases the VOAs may be dispensed with altogether.

Any of a variety of Radio Frequency (RF) VGAs known in the art may be used, and are readily available at moderate cost. As is well known in the art, other analog signal processing devices (such as, for example, band-pass filters, low noise amplifiers etc.) will normally be connected in the analog signal path between the photodetectors 12 and the A/D converters 16, along with the VGAs 42. However, for the purposes of clarity, these elements are not shown in the drawings.

In some embodiments, the control unit 44 may be provided as a Field Programmable Gate Array (FPGA), but this is not essential. Other digital and/or analog signal processing devices may equally be used, as will be appreciated by those of ordinary skill in the art.

In operation, the control unit 44 taps the output of each A/D converter 16 to obtain a respective sample stream 46. In some embodiments, the A/D converters 16 are designed to operate at a sample rate of 20 GHz or more. In such cases, a decimation function may be used to reduce the sample rate supplied to the control unit 44. In some embodiments, the sample rate supplied to the control unit 44 is about ¼ that of the main signal path, or less. Each sample stream 46 is processed by the control unit 44 to obtain a metric of signal quality, which can then be used to derive common and differential gain error components for each received polarization. In the illustrated embodiments, the common gain error component is used to control the VOAs 40, while the differential error components are used to control the VGAs 42.

Figure 3A:
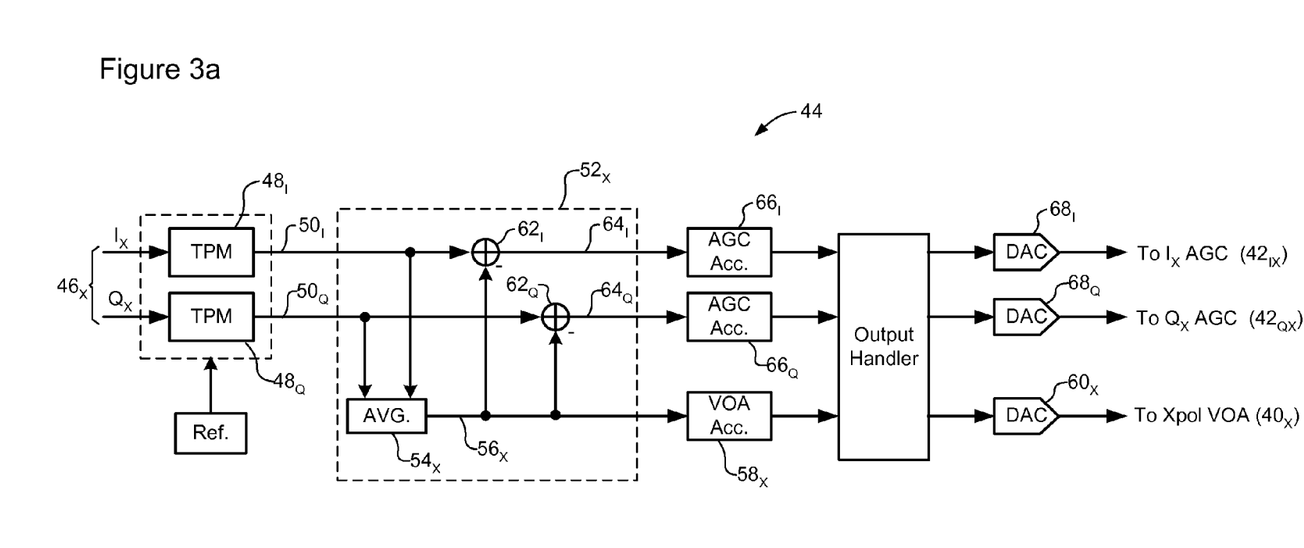
FIGS. 3a and 3b are block diagrams schematically illustrating principal elements and operations of the control unit of FIG. 2a in greater detail.
Figure 3B:
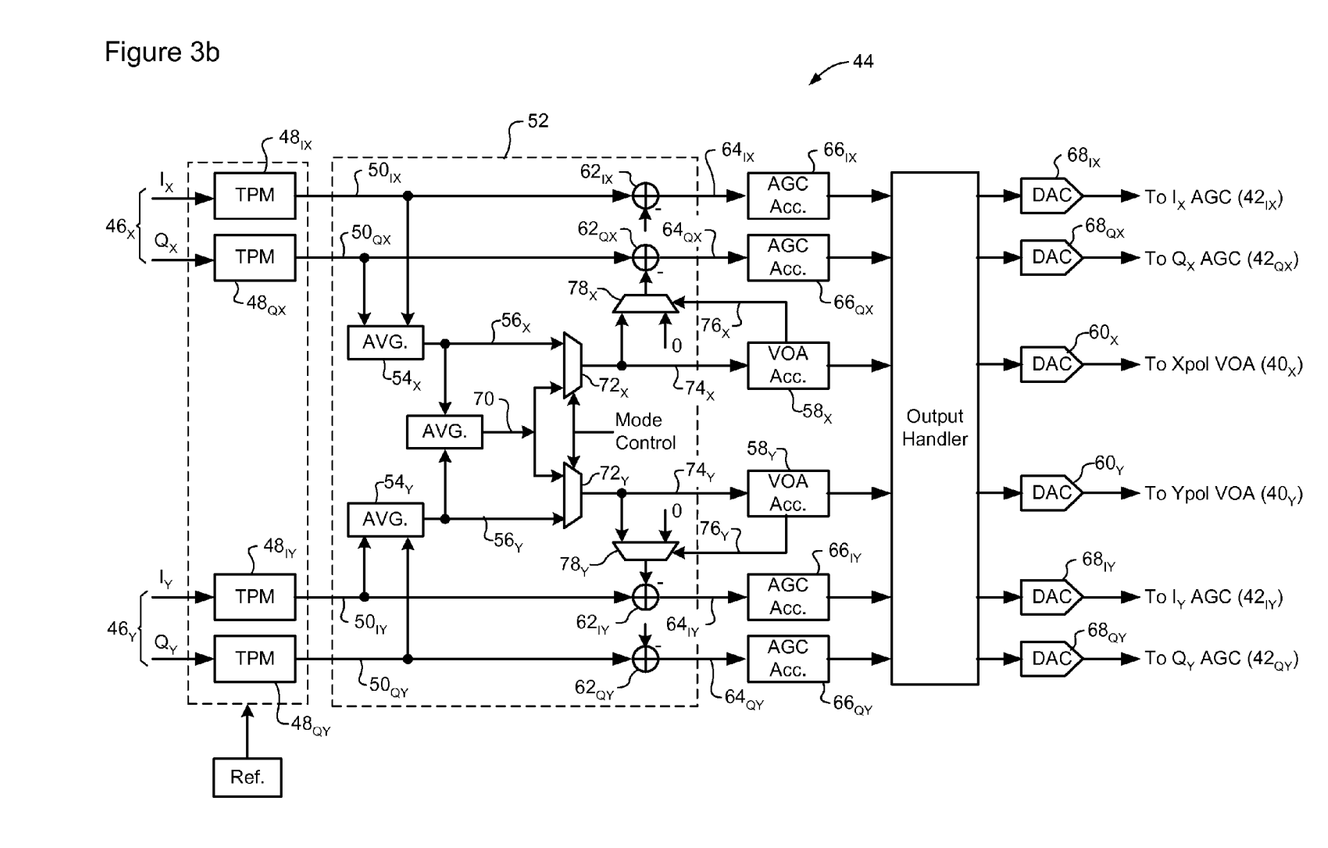

With this arrangement, the system is capable of equalizing differential channel power due to Polarization Dependent Loss (PDL), depending primarily on the PDL angle. In an ideal case in which the PDL angle is zero (i.e. the maximum and minimum axes are aligned with the beam splitter 4), the system of the invention is capable of completely compensating PDL. This PDL compensation performance drops to a minimum (nominally zero) at a PDL angle of 45°. However, because the PDL angle is constantly changing, the system will normally be operating at some point between these two extremes, and thus will provide at least partial compensation of PDL. FIG. 3 illustrates principal operations of a control unit 44 usable in the present invention.

In the embodiment of FIG. 3, the signal quality metric used is a tail probability, which may be represented as the number of samples, within a predetermined gate period, which fall outside a predetermined range of values. In some embodiments, the predetermined gate period corresponds to a selected number of samples (e.g. 1024 samples) of the sample signal 46. The predetermined range of values used for this analysis can be selected to discriminate between ASE and thermal noise on the one hand, and a "real" optical signal on the other. In particular, a real optical signal will tend to increase the power density of each sample stream 46, and so increase the tail probability, as compared to ASE and thermal noise. Consequently, the value range used for determining the tail probability can be selected to act as a "cut-off" to prevent the control system from being captured by ASE. An advantage of using tail probability as the signal quality metric is that it is independent of the content of the received optical signal, and thus yields usable information even in the presence of unknown and/or ambiguous sample phase and uncompensated optical impairments.

Alternatives to the tail probability can be used, if desired. For example, RMS power, DC mean, sum of squares, a maximum value in a predetermined time interval, and a higher order moment are all examples of digital signal metrics that may be used for the purposes of the present invention, either alone or in combination with the tail probability. Furthermore, a suitable metric can be calculated from the Jones Matrix values used in the polarization compensator 30. Other suitable signal metrics can be derived from the digital sample streams 18. For example a time windowed or peak correlation to a framing or synch pattern could be used to determine a metric indicative amount of signal present. Such an arrangement would have the advantage of very high noise rejection.

FIG. 3a shows the process flow for the X-polarization, it being understood that substantially identical processing will be implemented for the Y-polarization. As may be seen in FIG. 3a, samples tapped from the output of each of the x-polarization A/D converters 16 are supplied to respective tail probability monitors (TPM) 48 which calculate a respective I and Q tail probabilities as described above. The tail probability is then compared to a reference value to calculate I and Q TPM error values 50, which are then passed to an error processing block 52.

In general, the error processing block 52 operates to separate the I and Q TPM error values into a common mode error and a pair of differential errors. Thus, the I and Q error values 50 output by the TPM blocks 48 are supplied to a averaging block 54, which calculates an average or mean TPM error 50. The mean TPM error 56 is then supplied to a VOA accumulator 58, which adds successive values over a predetermined number of gate periods (e.g. 16 or 32 gate periods) to compute the common mode error. The resulting common mode error value is then output to a Digital-to-Analog converter (DAC) 60 to control the X-polarization VOA 40x.

The mean TPM error 56 is also subtracted from both of the I and Q TPM errors 50 (at 62), and the resulting differential values 64 accumulated by respective I and Q AGC accumulators 66 to generate the I and Q differential error values. Each of the I and Q differential error values are then output to a respective Digital-to-Analog converter (DAC) 68 to generate a control signal for driving the corresponding VGA 42.

If desired, the differential and common mode error values can be scaled at the input and/or output of each accumulator 60, 68.

FIG. 3b is a block diagram showing an alternative process flow, in which the mean TPM error value 56 calculated for the X and Y polarizations are combined to produce a common mean 70. A respective mode select switch 72 for each polarization can be used to select either the polarization's own mean error 56, or the common mean TPM error 70. In either case, the selected mean value 74 is used as described above to accumulate the common mode error value and calculate the respective I and Q differential error values of each polarisation.

As may be appreciated, it is possible for common mode error to exceed the linear range of the VOA 40. In most cases, the dynamic range of the VGAs 42 will be sufficiently large that at least some of the excess common mode error may be compensated using the VGAs 42. In the embodiment of FIG. 3b, this capability is implemented by arranging that the maximum value of the VOA accumulators 58 is selected to correspond with the linear range of the VOA 40. As a result, common mode errors that exceed the linear range of the VOA 40 will trigger an overflow of the VOA accumulator 58. When this occurs, the VOA accumulator 58 is held at its maximum value, and a VOA overflow signal 76 is generated. This VOA overflow signal 76 is supplied to a selector switch 78, which operates to block subtraction of the selected mean TPM error 74 from the I and Q TPM error values 50 generated by the TPM blocks 48 during the remainder of that gate period. As a result, the I and Q differential errors generated by the AGC accumulators 66 during that gate period will reflect the respective differential error components, as well as the excess portion of the common mode error.

The control loops described above with reference to FIGS. 3a and 3b are advantageous for optimizing the dynamic range of the receiver, but other loop configurations could be used if desired. Some of the alternative VOA configurations described above would naturally require corresponding modifications in the control loop design, all of which modifications are considered to be within the purview of those of ordinary skill in the art. Substantially orthogonal linear control loops have been described for the X and Y polarizations, as those are advantageous. However, control loops with coupled or nonlinear characteristics could be implemented.

The electrical gain function is described above as being implemented using a separate Variable Gain Amplifier (VGA) 42 installed in the analog signal path, but this is not essential. Rather, the electrical gain function could be incorporated into the A/D converters 16 and/or as a digital scaling function implemented downstream of the A/D converters 16, if desired.

Figure 4:
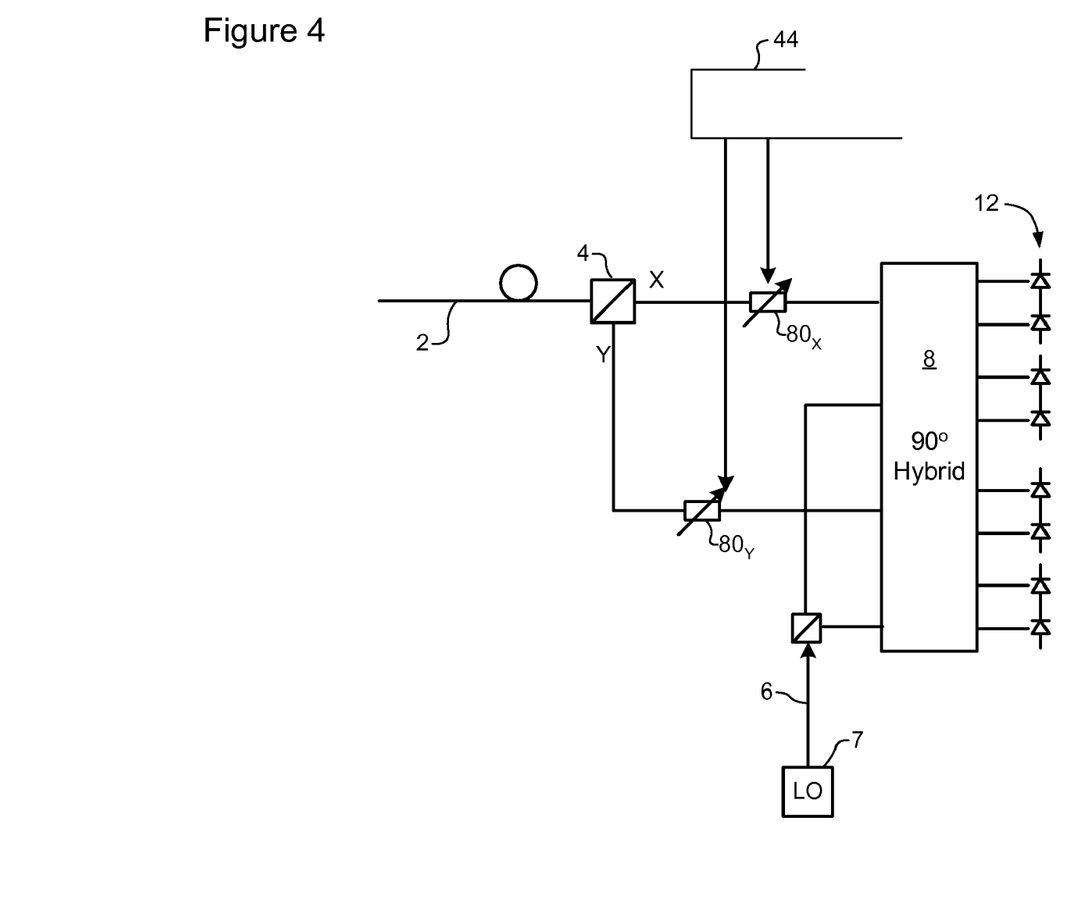
FIG. 4 is a block diagram schematically illustrating principal elements and operations of a control loop in accordance with a further embodiment of the present invention.

Similarly, the VOAs 40 are described above as being flat loss elements, with a substantially linear response, but this is not essential. VOA's with a non-linear response may equally be used. Furthermore, the VOAs 40 may be implemented as an optical gain element (as opposed to a loss-element). An element with electrically variable PDL or polarization rotation could be used, either alone or in combination with the described VOAs. For example, FIG. 4 illustrates an embodiment in which the VOAs 42 of FIG. 2 are replaced by variable polarization rotators (VPRs) 80. In this case, the VPRs 80 operate in response to a control signal from the control unit 4 to impose a voltage-controlled rotation of the polarization angle. This allows the degree of polarization alignment between each polarization of the received optical signal and its corresponding polarization of the LO signal 6 to be adjusted. As will be appreciated, adjusting the degree of alignment in this manner will produce a corresponding adjustment in the power level of the composite signals appearing at the output of the optical hybrid 8, in accordance with a sinusoidal response curve.

In the illustrated embodiments, the control loop is implemented entirely using digital signal processing techniques. However, this is not essential. Analog control techniques, or combined analog and digital methods may be implemented, if desired. Digital control functions as described above may be combined with analog power or gain control of certain elements to compensate imperfections of the analog method, while keeping a desirable aspect of the analog method such as a speed of response. For example, an analog control function could be used to control the VGAs 42, along with the described digital control of the VOAs 40.

The embodiments of the invention described above are intended to be illustrative only. The scope of the invention is therefore intended to be limited solely by the scope of the appended claims.

We claim:

1. In a coherent optical receiver having a photodetector block for generating analog signals corresponding to each one of a pair of orthogonal polarizations of an optical signal received through an optical communications system, and a respective Analog-to-Digital (A/D) converter for generating a respective high-speed multi-bit digital sample stream corresponding to each analog signal, a method of at least partially compensating an effect of Polarization Dependent Loss (PDL) in the received optical signal, the method comprising steps of:

tapping an output of each A/D converter to obtain a respective sample stream having a lower sample rate than the respective high speed multi-bit sample stream generated by the A/D converter;

deriving, based on the tapped sample streams, a respective metric value indicative of a quality of each high speed multi-bit sample stream; and adjusting a power difference between the analog signals of each polarization, upstream of the respective A/D converter, based on the derived metric values.

2. A method as claimed in claim 1, wherein the step of tapping the multi-bit sample stream comprises a decimation function for reducing a sample rate of the tapped sample stream relative to the multi-bit sample stream.

3. A method as claimed in claim 2, wherein the decimation function comprises extracting a subset of samples of each multi-bit sample stream.

4. A method as claimed in claim 1, wherein the respective metric value is any one or more of:
   a tail probability error;
   an RMS power;
   a sum of squares;
   a maximum value within a predetermined time interval; and
   a higher order moment.

5. A method as claimed in claim 1, wherein the respective metric value is derived from Jones Matrix coefficients of a digital polarization compensator of the coherent optical receiver.

6. A method as claimed in claim 4, wherein the respective metric value is a tail probability error and the step of deriving the respective metric value comprises steps of:
   counting, during a predetermined gate period, a number of samples of the tapped sample stream having a value that lies outside a predetermined range; and
   comparing the count result to a predetermined threshold value.

7. A method as claimed in claim 6, wherein the predetermined gate period corresponds to a predetermined number of samples of the tapped sample stream.

8. A method as claimed in claim 1, wherein the step of minimizing the signal power differential comprises, for each received polarization of the optical signal, a step of adjusting a gain of a signal path traversed by the polarization.

9. A method as claimed in claim 8, wherein, for each polarization, the multi-bit sample stream comprises respective In-phase (I) and Quadrature (Q) multi-bit sample streams, and the metric value comprises respective I and Q metric values corresponding to the I and Q sample streams.

10. A method as claimed in claim 9, wherein the step of adjusting gain of the analog signal path comprises, for each polarization, steps of:
   calculating respective differential and common mode error components of the metric;
   controlling an optical power level of the polarization using the common mode error component; and
   controlling an electrical power gain using the differential error component.

11. A method as claimed in claim 10, wherein the step of controlling an optical power level of the polarization comprises controlling any one or more of:
   a Variable Optical Attenuator (VOA) operatively coupled in an optical signal path traversed by either one or both of the polarization and a Local Oscillator (LO) signal; and a variable polarization rotation element operatively coupled in an optical signal path traversed by either one or both of the polarization and the LO signal.

12. A method as claimed in claim 10, wherein the step of controlling electrical power gain comprises controlling any one or more of:
- a Variable Gain Amplifier (VGA) traversed by an electrical signal derived from the polarization;
- a digital gain of an Analog-to-Digital (A/D) converter operatively coupled to sample the electrical signal; and
- a digital scaling function for scaling an output of the A/D converter.

13. A method as claimed in claim 10, wherein the VOA is controlled based on a first portion of the common mode error component, and the VGA is controlled based on the differential error component and a second portion of the common mode error component.

14. A method as claimed in claim 13, wherein the first portion of the common mode error component corresponds with a maximum common mode error that can be compensated with a linear range of the VOA, and the second portion of the common mode error component corresponds to an excess common mode error exceeding that which can be compensated with the linear range of the VOA.

15. In a coherent optical receiver having a photodetector block for generating analog signals corresponding to each one of a pair of orthogonal polarizations of an optical signal received through an optical communications system, and a respective Analog-to-Digital (A/D) converter for generating a respective high-speed multi-bit digital sample stream corresponding to each analog signal, a system for at least partially compensating an effect of Polarization Dependent Loss (PDL) in the received optical signal, the system comprising:
- a tap for tapping an output of each A/D converter to obtain a respective sample stream having a lower sample rate than the respective high speed multi-bit sample stream generated by the A/D converter;
- a processor for deriving, based on the tapped sample streams, a respective metric value indicative of a quality of each high speed multi-bit sample stream; and
- equalizer means for minimizing a signal power differential between the analog signals of each polarization, upstream of the respective A/D converter, based on the derived metric values.

16. A system as claimed in claim 15, wherein the tap implements a decimation function for reducing a sample rate of the tapped sample stream relative to the multi-bit sample stream.

17. A system as claimed in claim 16, wherein the decimation function comprises extracting a subset of samples of each multi-bit sample stream.

18. A system as claimed in claim 15, wherein the processor comprises:
- a counter for counting, during a predetermined gate period, a number of samples of the tapped sample stream having a value that lies outside a predetermined range; and
- a comparator for comparing the count result to a predetermined threshold value.

19. A system as claimed in claim 15, wherein, for each polarization, the multi-bit sample stream comprises respective In-phase (I) and Quadrature (Q) multi-bit sample streams, and the metric value comprises respective I and Q metric values corresponding to the I and Q sample streams.

20. A system as claimed in claim 19, wherein the equalizer means comprises, for each polarization:
- an error processor for calculating respective differential and common mode error components of the metric;
- an optical element for controlling an optical power level of the polarization using the common mode error component; and
- an electrical gain element for controlling an electrical power gain using the differential error component.

21. A system as claimed in claim 20, wherein the optical element comprises any one or more of:
- a Variable Optical Attenuator (VOA) operatively coupled in an optical signal path traversed by either one or both of the polarization and a Local Oscillator (LO) signal; and
- a variable polarization rotation element operatively coupled in an optical signal path traversed by either one or both of the polarization and the LO signal.

22. A system as claimed in claim 20, wherein the electrical gain element comprises any one or more of:
- a Variable Gain Amplifier (VGA) traversed by an electrical signal derived from the polarization;
- a digital gain of an Analog-to-Digital (A/D) converter operatively coupled to sample the electrical signal; and
- a digital scaling function for scaling an output of the A/D converter.

23. A system as claimed in claim 20, wherein the optical element is controlled based on a first portion of the common mode error component, and the electrical gain element is controlled based on the differential error component and a second portion of the common mode error component.

24. A system as claimed in claim 23, wherein the first portion of the common mode error component corresponds with a maximum common mode error that can be compensated within a linear range of the optical element, and the second portion of the common mode error component corresponds to an excess common mode error exceeding that which can be compensated with the linear range of the optical element.

* * * * *